United States Patent
Johnston et al.

(10) Patent No.: US 10,240,964 B1
(45) Date of Patent: Mar. 26, 2019

(54) FUEL FILL VOLUME ESTIMATION USING VIRTUAL ZONE AND FUEL TANK FLOAT

(71) Applicant: Ford Global Technologies, LLC, Dearborn, MI (US)

(72) Inventors: Marla Johnston, Plymouth, MI (US); Paul A. Mueller, St. Clair Shores, MI (US); Zdravko Nikolik, Tecumseh (CA); David Divis, Dearborn, MI (US); Boris Gorovets, West Bloomfield, MI (US); John Dolinsky, Jr., Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/786,825

(22) Filed: Oct. 18, 2017

(51) Int. Cl.
| | |
|---|---|
| *G08B 21/00* | (2006.01) |
| *G01F 23/24* | (2006.01) |
| *B60K 35/00* | (2006.01) |
| *G01F 23/30* | (2006.01) |

(52) U.S. Cl.
CPC ............ *G01F 23/243* (2013.01); *B60K 35/00* (2013.01); *G01F 23/30* (2013.01)

(58) Field of Classification Search
CPC .............................. G01F 23/243; B60K 35/00
USPC ..................................................... 340/450.2
See application file for complete search history.

(56) References Cited

U.S. PATENT DOCUMENTS

| | | | |
|---|---|---|---|
| 7,865,317 B2 | 1/2011 | Begin | |
| 8,836,496 B2 | 9/2014 | Brown et al. | |
| 2001/0032506 A1* | 10/2001 | Keller | G01F 23/38 |
| | | | 73/313 |
| 2004/0133337 A1* | 7/2004 | Ito | G01F 23/0076 |
| | | | 701/123 |
| 2009/0109022 A1* | 4/2009 | Gangopadhyay | G01C 21/3407 |
| | | | 340/540 |
| 2010/0042340 A1* | 2/2010 | Piszko | G01F 9/008 |
| | | | 702/55 |

(Continued)

FOREIGN PATENT DOCUMENTS

| | | |
|---|---|---|
| CN | 105865566 A | 8/1916 |
| DE | 10119102 A1 | 10/2002 |

(Continued)

OTHER PUBLICATIONS

Patel, Raj et al., *Flow Meter and Arduino Based Fuel Gauge for Automotive Vehicles*, Sep. 2016, 8 pages.

*Primary Examiner* — Mark S Rushing
(74) *Attorney, Agent, or Firm* — James P. Muraff; Neal, Gerber & Eisenberg LLP (57) ABSTRACT

Method and apparatus are disclosed for fuel fill volume estimation for a vehicle. An example vehicle includes a fuel tank float, a dashboard display, and an engine control module. The engine control module divides a fuel tank into zones. When the vehicle is not in motion and a position of the fuel tank float changes by a threshold amount, engine control module measures an initial fuel level. When the position of the fuel tank float does not change for a threshold period of time, the engine control module measures a final fuel level. Additionally, the engine control module calculates an amount of fuel added to the fuel tank based on the zones associated with the initial fuel level and a final fuel level and display the amount on the dashboard display.

14 Claims, 4 Drawing Sheets

(56) References Cited

U.S. PATENT DOCUMENTS

| | | | | |
|---|---|---|---|---|
| 2010/0147059 A1* | 6/2010 | Son | ...................... | G01M 15/042 73/114.52 |
| 2014/0266650 A1* | 9/2014 | Newhouse | .......... | G01F 23/0061 340/425.5 |
| 2014/0360260 A1* | 12/2014 | Dudar | ...................... | G01F 23/22 73/204.11 |
| 2018/0012204 A1* | 1/2018 | Shetty | ...................... | G01F 23/24 |

FOREIGN PATENT DOCUMENTS

| | | |
|---|---|---|
| FR | 2786738 B1 | 2/2001 |
| JP | 2004271489 A | 9/2004 |

\* cited by examiner

FUEL FILL VOLUME ESTIMATION USING VIRTUAL ZONE AND FUEL TANK FLOAT

TECHNICAL FIELD

The present disclosure generally relates to vehicle fuel systems and, more specifically, fuel fill volume estimation for a vehicle.

BACKGROUND

Drivers are often interested in keeping a record of how much fuel is going into the fuel tank when they refuel. Sometimes, the drivers do not trust the reading on the gas pump. For examples, in regions in which fuel prices are high, drivers may suspect that the fuel pump's meter has been tampered.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments include a fuel tank float, a dashboard display, and an engine control module. The engine control module divides a fuel tank into zones. When the vehicle is not in motion and a position of the fuel tank float changes by a threshold amount, engine control module measures an initial fuel level. When the position of the fuel tank float does not change for a threshold period of time, the engine control module measures a final fuel level. Additionally, the engine control module calculates an amount of fuel added to the fuel tank based on the zones associated with the initial fuel level and a final fuel level and display the amount on the dashboard display.

An example method includes dividing a fuel tank into virtual zones. The method also includes, when the vehicle is not in motion and a position of a fuel tank float changes by a threshold amount, measuring an initial fuel level. Additionally, when the position of the fuel tank float does not change for a threshold period of time, the method includes measuring a final fuel level. The method also includes calculating an amount of fuel added to the fuel tank based on the virtual zones associated with the initial fuel level and a final fuel level, and displaying the amount on a dashboard display.

An example vehicle a refueling switch and an engine control module. The engine control module divides a fuel tank into zones. When the refueling switch is in a first position, engine control module measures an initial fuel level. When the refueling switch is in a second position, the engine control module calculates an amount of fuel added to the fuel tank based on the zones associated with the initial fuel level and a final fuel level and displays the amount on a dashboard display.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In markets with high fuel prices, consumers can be suspicious that the readings of a fuel pump are not accurate. For example, the fuel pumps may not be well maintained or may be maliciously altered to indicate more fuel than actually delivered. Additionally, some consumers desire to maintain a record of fuel intake and mileage driven. In such situations, measuring the fuel intake into the vehicle should be independent of the measurements by the fuel pump. Generally, to measure the current fuel level in the fuel tank to display on a dashboard meter, the vehicle uses a fuel sender card. The fuel sender card is a thick film varitor with discrete pads that correspond to different resistances. The pads are associated with fuel level percent status (FLPS). The FLPS reading corresponds to the fuel level that is displayed on the dashboard. For example, a reading of 1000 FLPS may be associated with a full fuel tank and a reading of 500 FLPS may be associated with a half full fuel tank. The fuel sender card is coupled to a float that floats on top of the fuel in the fuel tank. As the level of the fuel tank changes, the fuel float arm that connects the float and the fuel sender card changes resistance. Because the geometries of different fuel tanks are different, the FLPS are calibrated to the particular model of fuel tank.

Current fuel level measurement systems do not provide an measurement of the fuel level in the fuel tank accurate enough to compare to the reading off of the fuel pump. Generally, because the fuel gauges on the dashboard are designed to give an approximation of the fuel level, the fuel sender card is not designed to measure the level of the fuel tank with a high level of accuracy. For example, a fuel sender card may only have 50 pads. In such an example, if the fuel tank has a capacity of 50 liters, the fuel sender card has a precision of 1 liter. Within fuel tanks, there are regions above and below where the fuel sender card can measure. For example, because of the physical limitations of the connection between the float and the fuel sender card, there may be fuel above the highest measurable reading on the fuel sender card or fuel below the lowest measuring reading on the fuel sender card. Typical automotive fuel level measurement systems do not account for these areas of the fuel tank.

As disclosed below, a fuel fill manager determines the amount of fuel input into a fuel tank. The fuel fill manager tracks current fuel level over time and the change in the fuel level. When the change in the fuel level is positive (e.g., fuel is being added to the fuel tank), it calculates the amount of fuel added. To calculate the amount of fuel added, the fuel fill manager divides the fuel tank into three zones. The fuel fill manager defines the first zone (sometimes referred to "Zone A") to be the area of the fuel tank above the pad of the fuel card sender that represents a full fuel tank. Generally, zone A represents a small portion of the total fuel tank volume (e.g., ≤0.2% etc.). For example, if the total fuel tank value is 50 liters, zone A may have a volume of 0.1 liters. The fuel fill manager defines the second zone (sometimes referred to "Zone B") to be the area of the fuel tank between the pads of the fuel card sender that represents a full fuel tank and an empty fuel tank, or know as Usable Capacity. The fuel fill manager defines the third zone (sometimes referred to "Zone C") to be the area of the fuel tank below the pad of the fuel card sender that represents fuel that cannot be directly measured by the fuel level float and is measured by secondary methods such as a fuel flow parameter from a powertrain control module (PCM). The fuel flow parameter is a measurement by the powertrain control module of the fuel injected into the engine by the fuel injectors. The fuel flow parameter is a precise measurement of the injected fuel. For example, the fuel flow parameter may have a milliliter accuracy.

The fuel fill manager calculates the fuel added based on the zone in which the fuel level started and the zone in which the fuel level ended after a refueling event. When the initial fuel level is in zone C, the fuel fill manager uses the fuel flow parameter to estimate the amount of fuel used by the vehicle and the associated tank fuel level. In such a manner, the fuel fill manager knows how far below the beginning, or top, of zone C the initial fuel level is. For example, based on data from the fuel flow parameter, the fuel fill manager may determine that the current fuel level is 0.10 liters below the position in the fuel tank at which zone B and of zone C meet. In such an example, if the fuel fill manager measures the final fuel level in zone B is 0.30 liters, using the fuel float reading, and the fuel fill manager estimates that the initial fuel level zone C is 0.10 liters below the position in the fuel tank at which zone B and of zone C meet as measured using the fuel flow parameter. In that examples, the fuel fill manager calculates the total fuel added to be 0.4 liters. When the initial fuel level starts in zone B, the fuel fill manager uses the FLPS reading from the fuel card sender to determine the initial fuel level. When the final fuel level is in zone A, the fuel fill manager treats the final fuel level as if it were the fuel level as measured by the pad of the fuel sender card that represents a full fuel tank.

In some examples, the fuel sender card includes enough pads to provide a target resolution for the fuel added to the fuel tank. The fuel sender card includes a ceramic substrate that is large enough to accommodate the necessary number of pads. For example, the target resolution is 0.25 liters. In such an example, if the total fuel tank value is 50 liters, then the fuel sender card may include 200 pads.

Figure 1:
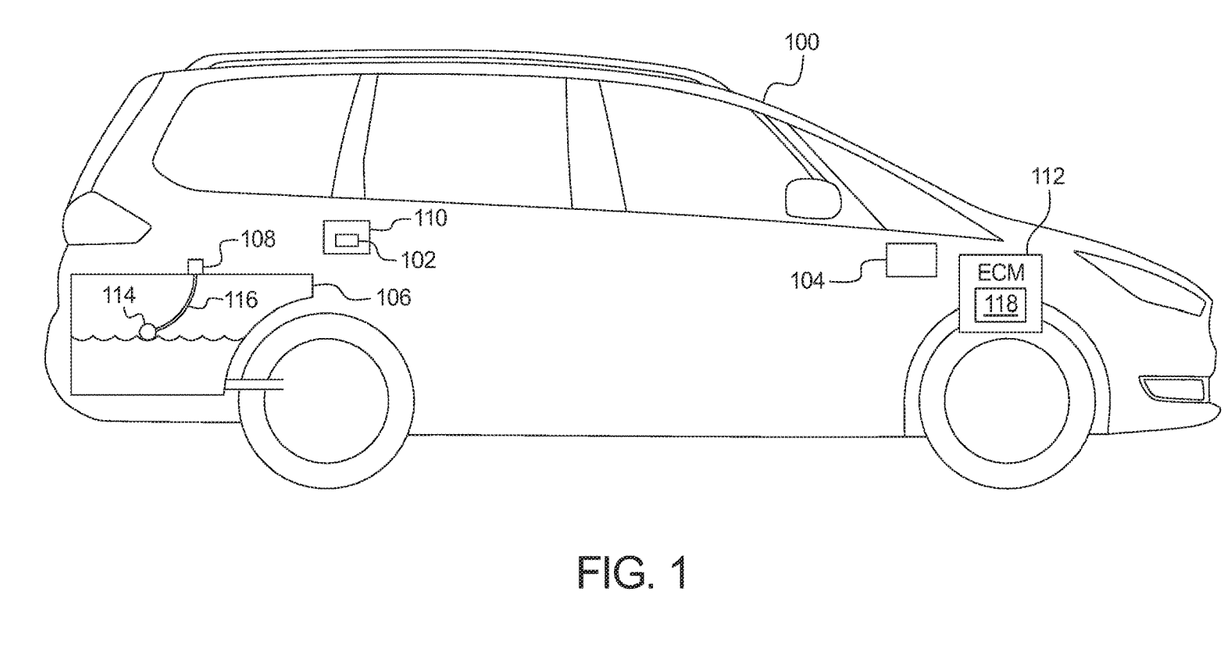
FIG. 1 illustrates a vehicle operating in accordance with the teachings of this disclosure.

FIG. 1 illustrates a vehicle 100 operating in accordance with the teachings of this disclosure. The vehicle 100 may be a standard gasoline powered vehicle, a diesel vehicle, a hybrid vehicle and/or any other mobility implement type of vehicle with a fuel tank. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes a refueling switch 102, a dashboard display 104, a fuel tank 106, a fuel sender card 108, a refueling door 110, and an engine control module (ECM) 112.

The refueling switch 102 is embedded into the refueling door 110. When the refueling door 110 is open, the refueling switch 102 signals that fuel will be added to the fuel tank 106 (e.g., signals the start of a "refueling mode"). When the refueling door 110 is closed, the refueling switch 102 signals that fuel will no longer be added to the fuel tank 106 (e.g., signals the end of the "refueling mode"). Alternatively, in some examples, the refueling switch 102 detects the nozzle of the fuel pump entering and exiting the nozzle receptacle of the vehicle 100.

The dashboard display 104 provides an interface between the vehicle 100 and a user. The dashboard display 104 may include analog displays (e.g., gauges, back-lit displays, eight-segment displays, etc.) and/or digital displays (e.g., a liquid crystal display ("LCD"), an organic light emitting diode ("OLED") display, a solid state display, etc.). The dashboard display 104 communicates information to the user, such as vehicle speed, current fuel tank level, engine coolant temperature, engine revolutions per minute (RPM), oil pressure, battery state, faults, and/or warnings, etc. Additionally, the dashboard display 104 of the illustrated example, when the refueling switch 102 is signals the beginning and/or end of the refueling mode, displays a volume of fuel added to the fuel tank in the refueling state. In some examples, the dashboard display 104 displays the amount of fuel added after the end of the refueling mode. Alternatively, in some examples, the dashboard display 104 displays the amount of fuel added while in the refueling mode (e.g., the display updates as fuel is added to the fuel tank 106).

The fuel sender card 108 measures the level of fuel in the fuel tank 106. A float 114 floats on top of the fuel in the fuel tank 106. A fuel float arm 116 physically couples the float to the fuel sender card 108. The fuel sender card 108 includes a thick film potentiometer with discrete pads that correspond to different resistances. The fuel float arm 116 is positioned on one of the pads based on the level of the fuel in the fuel tank 106 as indicated by the float 114. The thick film potentiometer is electrically coupled to a voltage divider that outputs a voltage depending on which pad the fuel float arm 116 is positioned on. The voltage divider is electrically coupled to an analog-to-digital converter (ADC). The output of the ADC is calibrated according to the geometry of the fuel tank 106. This calibrated value is the fuel level percent status (FLPS) that the engine control module 112 uses to determine the current level of fuel in the fuel tank 106 and the amount of fuel input into the fuel tank 106. The resolution of the fuel sender card 108 is determined by the number of pads and the total usable volume of the fuel tank 106. In some examples, the resolution is between 0.25 liters and 0.50 liters. In some such examples, the fuel sender card 108 has a resolution of 0.25 liters. For example, if the total usable volume of the fuel tank 106 is 30 liters and the resolution is 0.25, the fuel sender card 108 may have 120 pads. In some examples, the fuel sender card 108 has at least 100 pads. The resolution determines what increments that the dashboard display 104 can display the volume of the input fuel.

The engine control module 112 (sometimes referred to as the "powertrain control module") includes hardware and firmware to control the ignition, fuel injection, emission systems, transmission and/or the brake system of the vehicle 100. The engine control module 112 monitors sensors (such as fuel injection sensors, wheel speed sensors, exhaust sensors, etc.) and uses control algorithms to control, for example, fuel mixture, ignition timing, variable cam timing, emissions control, a fuel pump, an engine cooling fan and/or a charging system. The engine control module 112 measures the amount of fuel injected into the engine by fuel injectors. Additionally, the engine control module 112 uses variance in the level of the float 114 to determine when to update the fuel gauge on the dashboard display 104. In the illustrate example, the engine control module 112 includes a fuel fill manager 118.

Figure 2:
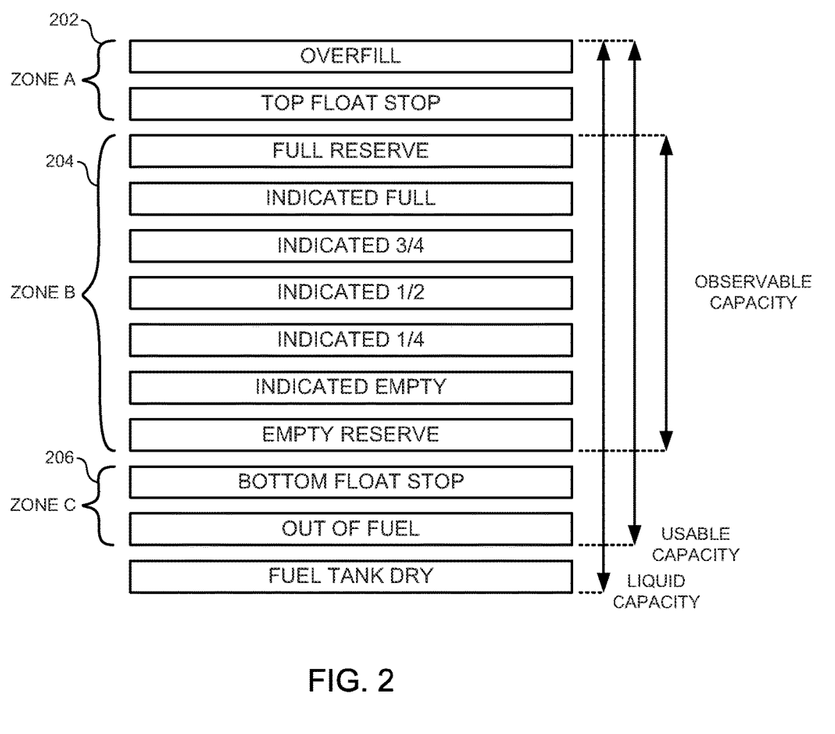
FIG. 2 is a chart illustrating fuel zones within a fuel tank of the vehicle of FIG. 1.

The fuel fill manager 118 monitors the fuel level in the fuel tank via the fuel sender card 108 and/or the fuel flow parameter from the engine control module 112. The fuel fill manager 118 defines virtual zones in the fuel tank 106. FIG. 2 illustrates the fuel tank 106 divided into three zones 202, 204, and 206. Zone A 202 includes the portion of the fuel tank 106 that is above the top float stop position of the float 114 that represents the top pad of the fuel sender card 108. Generally, the volume of fuel in Zone A 202 is small relative compared to the total usable capacity of the fuel tank 106 (e.g., ≤0.2%). Zone B 204 includes the portion of the fuel tank 106 that is measurable by the fuel sender card 108. A majority of the total usable capacity of the fuel tank 106 is within Zone B 204. Zone C 206 includes the portion of the fuel tank 106 that is below the bottom float stop position of the float 114 that represents the bottom pad of the fuel sender card 108. Thus, the fuel in Zone C 206 is not measurable by the fuel sender card 108.

Returning to FIG. 1, the fuel fill manager 118 determines the volume of fuel pumped into the fuel tank 106 when a refueling event is triggered. In some examples, the refueling event is triggered when the float 114 indicates that the volume of the fuel in the fuel tank 106 has increased by more than a threshold value (e.g., 5%, etc.) when the vehicle 100 is not in motion. Alternatively, in some examples, the refueling event is triggered when the refueling switch 102 is toggled to the refueling mode. To determine the volume of fuel pumped into the fuel tank 106, the fuel fill manager 118 records the initial fuel level when the refueling event is triggered. The fuel fill manager 118 determines the initial fuel level based on the position of the float 114 as indicated by the fuel sender card 108. When the fuel sender card 108 indicates that the float 114 is at the top float stop, the fuel fill manager 118 determines that the initial fuel level is in Zone A 202. When the fuel sender card 108 indicates that the float 114 is at the bottom float stop, the fuel fill manager 118 determines that the initial fuel level is in Zone C 206. When the fuel sender card 108 indicates that the float 114 is between the top float stop and the bottom float stop, the fuel fill manager 118 determines that the initial fuel level is in Zone B 204. When the fuel sender card 108 indicates that the float 114 is at the bottom float stop, the fuel fill manager 118 tracks, via the fuel flow parameter, the amount of fuel being injected into the engine and since the fuel sender card 108 first indicated that the float 114 is at the bottom float stop.

Based on the zone 202, 204, and 206 of the initial fuel level and the zone 202, 204, and 206 of the final fuel level, the fuel fill manager 118 calculates the volume of fuel added to the fuel tank 106. In some examples, the fuel fill manager 118 calculates the volume of fuel added to the fuel tank 106 based on Table (1) below.

TABLE (1)

Added Fuel Measurement Based on Zones

| Initial Zone | Final Zone | Calculation |
|---|---|---|
| Zone A | Zone A | 0 (Added amount not within resolution) |
| Zone B | Zone A | Amount of fuel as measured by Fuel Card Sender |
| Zone B | Zone B | Amount of fuel as measured by Fuel Card Sender |
| Zone C | Zone A | Amount of fuel in Zone B plus the fuel volume as measured by the fuel flow parameter in Zone C |
| Zone C | Zone B | Amount of fuel as measured by the Fuel Card Sender in Zone B plus amount of fuel as measured by the fuel flow parameter in Zone C |
| Zone C | Zone C | 0 (Added amount not within resolution) |

On Table (1) above, the fuel fill manager 118 calculates the change in fuel level when the amount of fuel is increasing. For example, when the initial fuel level is in Zone B 204 and the final fuel level is in Zone C, the fuel fill manager 118 does not perform a calculation. When the initial fuel level is in Zone A 202 and the final fuel level is in Zone A 202, the fuel fill manager 118 indicates that the amount of fuel added is 0 liters because the amount added is negligible. When the initial fuel level is in Zone B 204 and the final fuel level is in Zone A 202, the fuel fill manager 118 determines the amount added by subtracting the initial fuel level as indicated by the fuel sender card 108 from the total fuel volume of Zone B 204. When the initial fuel level is in Zone B 204 and the final fuel level is in Zone B 204, the fuel fill manager 118 subtracts the initial fuel level from the final fuel level as indicated by the fuel sender card 108. When the initial fuel level is in Zone C 206 and the final fuel level is in Zone A 202, the fuel fill manager 118 adds the amount of fuel used in Zone C 206 to the total fuel volume of Zone B 204. When the initial fuel level is in Zone C 206 and the final fuel level is in Zone B 204, the fuel fill manager 118 adds the amount of fuel in Zone C 206 to the amount of fuel in Zone B 204 as indicated by the fuel sender card 108. When the initial fuel level is in Zone C 206 and the final fuel level is in Zone C 206, the fuel fill manager 118 indicates that the amount of fuel added is 0 liters because the amount added is negligible.

Figure 3:
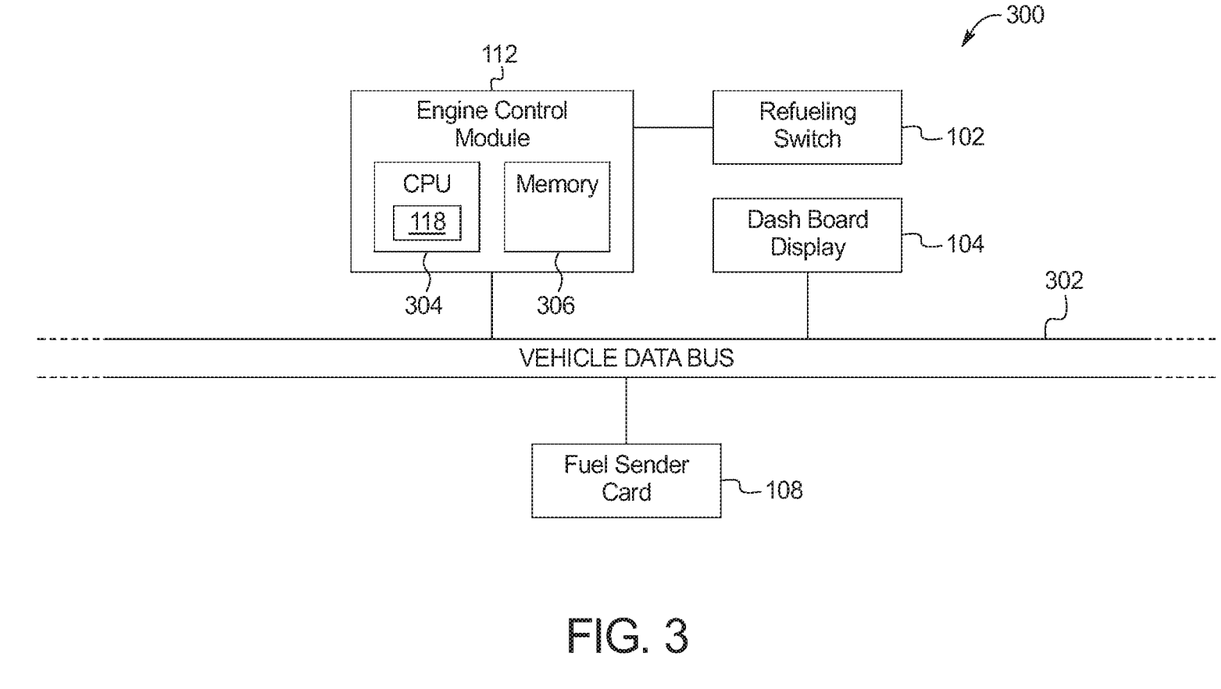
FIG. 3 is a block diagram of electronic components of the vehicle of FIG. 1.

FIG. 3 is a block diagram of electronic components 300 of the vehicle 100 of FIG. 1. In the illustrated example, the electronic components 300 includes the refueling switch 102, the dashboard display 104, the fuel sender card 108, the engine control module 112, and a vehicle data bus 302.

The engine control module 112 includes a processor or controller 304 and memory 306. In the illustrated example, the engine control module 112 is structured to include fuel fill manager 118. The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 306 includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 302 communicatively couples the dashboard display 104, the fuel sender card 108, and the engine control module 112. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
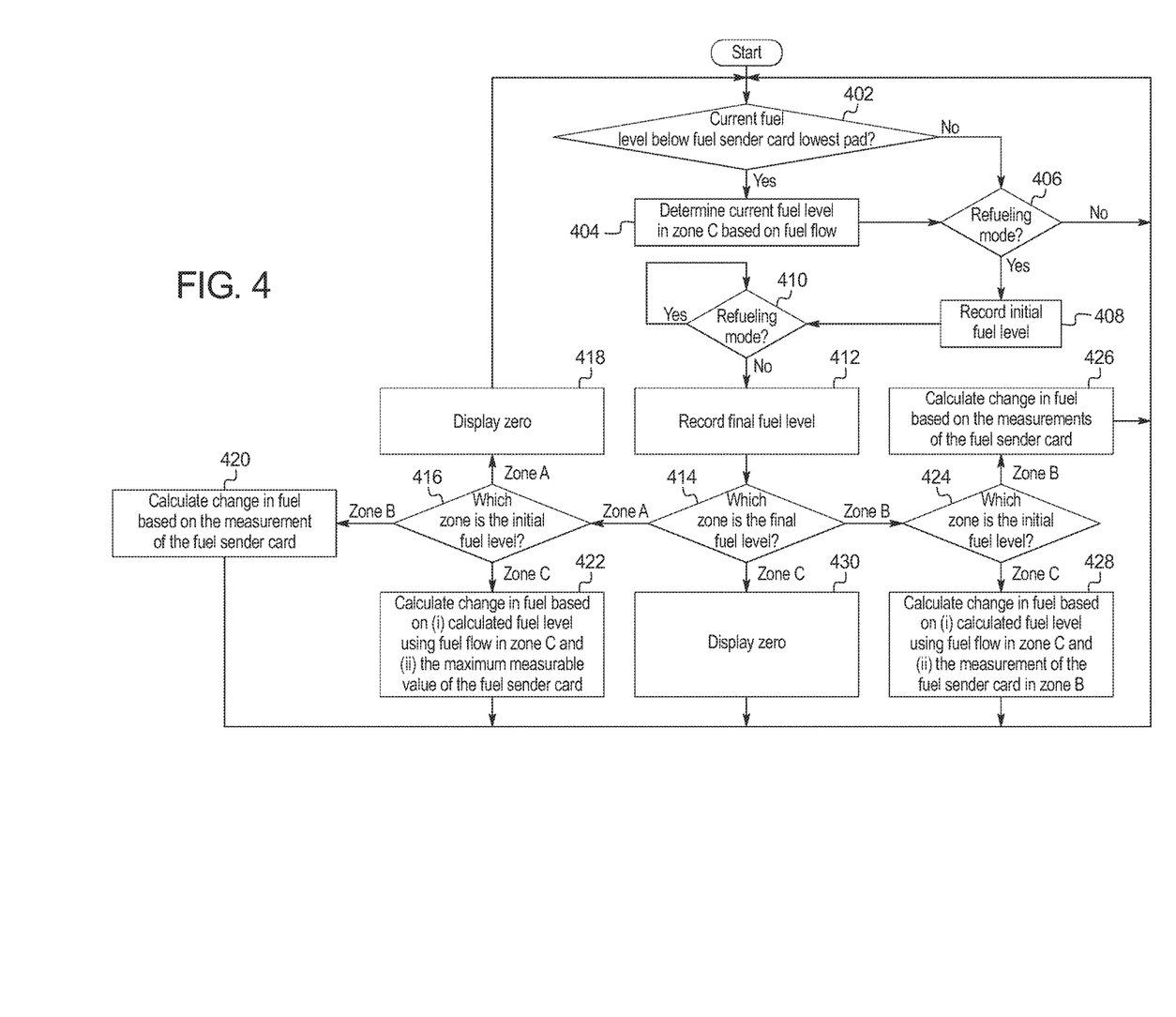
FIG. 4 is a flowchart of a method to estimate the fuel fill volume of fuel added to the fuel tank, which may be implemented by the electronic components of FIG. 3.

FIG. 4 is a flowchart of a method to estimate the fuel fill volume of fuel added to the fuel tank 106, which may be implemented by the electronic components 300 of FIG. 3. Initially, at block 402, the fuel fill manager 118 determines whether the fuel level is below the bottom float stop as indicated by the fuel sender card 108. When the fuel level is below the bottom float stop, the method continues at block 404. When the fuel level is above the bottom float stop, the method continues a block 406. At block 404, the fuel fill manager 118 determines the fuel level in zone C 206 based on the fuel flow parameter. At block 406, the fuel fill manager 118 determines whether it is in the refueling mode. For example, the fuel fill manager 118 may be in the refueling mode when the refueling switch 102 is toggled into the refueling state. As another example, the fuel fill manager 118 may be in the refueling mode when the float 114 begins to rise in the fuel tank 106 after the vehicle 100 has stopped. When the refueling switch 102 is toggled into the refueling state, the method continues at block 408. Otherwise, when the refueling switch 102 is toggled into the non-refueling state, the method returns to block 402.

At block 408, the fuel fill manager 118 records the current fuel level as the initial fuel level. At block 410, the fuel fill manager 118 waits until the refueling mode ends. For example, the refueling mode may end when the refueling switch 102 is toggled into the non-refueling state. As another example, the refueling mode may end after a threshold period of time (e.g., 15 second, 30 seconds, etc.) after the float 114 stops rising. At block 412, the fuel fill manager 118 records the current fuel level as the final fuel level. At block 414, the fuel fill manager 118 determines which zone 202, 204, and 206 the final fuel level is in. When the final fuel level is in Zone A 202, the method continues at block 416. When the final fuel level is in Zone B 204, the method continues at block 424. When the final fuel level is in Zone C 206, the method continues at block 430.

At block 416, the fuel fill manager 118 determines which zone 202, 204, and 206 the initial fuel level is in. When the initial fuel level is in Zone A 202, the method continues at block 418. When the initial fuel level is in Zone B 204, the method continues at block 420. When the initial fuel level is in Zone C 206, the method continues at block 422. At block 418, the fuel fill manager 118 causes the dashboard display 104 to display a message that the amount of fuel added is lower than the resolution of the system At block 420, the fuel fill manager 118 calculates the change in fuel based on the total fuel capacity of Zone B 204. At block 422, the fuel fill manager 118 calculates the change in fuel based on the total fuel capacity of Zone B 204 and the calculated fuel flow in Zone C 206.

At block 424, the fuel fill manager 118 determines which zone 202, 204, and 206 the initial fuel level is in. When the initial fuel level is in Zone B 204, the method continues at block 426. When the initial fuel level is in Zone C 206, the method continues at block 428. At block 426, the fuel fill manager calculates the change in fuel based on the measurements of the fuel sender card 108. At block 428, the fuel fill manager calculates the change in fuel based on the measurements of the fuel sender card 108 and the calculated fuel flow in Zone C 206.

At block 430, the fuel fill manager displays a message indicating that the amount of fuel added is not within the resolution of the system.

The flowchart of FIG. 4 is representative of machine readable instructions stored in memory (such as the memory 306 of FIG. 3) that comprise one or more programs that, when executed by a processor (such as the processor 304 of FIG. 2), cause the engine control module 112 to implement the example fuel fill manager 118 of FIGS. 1 and 3. Further, although the example program(s) is/are described with reference to the flowchart illustrated in FIG. 4, many other methods of implementing the example fuel fill manager 118 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. As used here, the terms "module" and "unit" refer to hardware with circuitry to provide communication, control and/or monitoring capabilities, often in conjunction with sensors. "Modules" and "units" may also include firmware that executes on the circuitry. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a dashboard display;
a fuel tank float coupled to a fuel sender card and;
an engine control module to:
  divide a fuel tank into zones, the zones including a first zone, the first zone being an area of the fuel tank that is not measurable by the fuel sender card;
  when the vehicle is not in motion and a position of the fuel tank float changes by a threshold amount, measure an initial fuel level;
  when the position of the fuel tank float does not change for a threshold period of time, measure a final fuel level;
  responsive to the final fuel level being in one of the zones that is not the first zone and the initial fuel level being in the first zone, calculate an amount of fuel added to the fuel tank based on the measurements of fuel injected to an engine by fuel injectors and measurements of the fuel sender card; and
  display the amount on the dashboard display.

2. The vehicle of claim 1, wherein the zones are based on a range of the fuel tank float in the fuel tank in relation to a setting on the fuel sender card.

3. The vehicle of claim 2, wherein one of the zones is defined as an area above a top float stop position in the fuel tank.

4. The vehicle of claim 2, wherein one of the zones is defined as an area between a top float stop position and a bottom float stop position in the fuel tank.

5. The vehicle of claim 2, wherein the first zone is defined as an area of the fuel tank below a bottom float stop position.

6. The vehicle of claim 1, wherein the engine control module is to:
  define a third zone as a first area above a top float stop position in the fuel tank;
  define a second zone as a second area between the top float stop position and a bottom float stop position in the fuel tank; and
  define the first zone as a third area below the bottom float stop position.

7. The vehicle of claim 6, wherein when the initial fuel level is in the third zone, the engine control module to determine that the amount of fuel added is zero.

8. The vehicle of claim 6, wherein when the initial fuel level is in the second zone, the engine control module is to calculate the amount of fuel added based on a fuel level measurement of a fuel sender card.

9. The vehicle of claim 8, wherein the fuel sender card has a resolution of at least 0.25 liters.

10. A method comprising:
dividing, with a processor of a vehicle, a fuel tank into virtual zones, the virtual zone including a first zone, the first zone being an area of the fuel tank that is not measurable by a fuel sender card coupled to a fuel tank float;
when the vehicle is not in motion and a position of the fuel tank float changes by a threshold amount, measuring an initial fuel level;
when the position of the fuel tank float does not change for a threshold period of time, measuring a final fuel level;
responsive to the final fuel level being in one of the virtual zone that is not the first zone and the initial fuel level being in the first zone, calculating an amount of fuel added to the fuel tank based on measurements of fuel injected to an engine by fuel injectors and measurements of the fuel sender card; and
displaying the amount on a dashboard display.

11. The method of claim 10, wherein the virtual zones are based on a position of the fuel tank float in the fuel tank in relation to a setting on the fuel sender card that has an resolution of at least 0.25 liters per pad.

12. The method of claim 10, wherein defining the virtual zones includes:
  defining a third zone as a first area above a top float stop position in the fuel tank;
  defining a second zone as a second area between the top float stop position and a bottom float stop position in the fuel tank; and
  defining the first zone as a third area below the bottom float stop position.

13. A vehicle comprising:
a fuel sender card coupled to a float; and
processors to:
  responsive to an initial fuel level being in an area of a fuel tank that is not measurable by the fuel sender card, calculate an added fuel amount based on measurements of fuel injected to an engine by fuel injectors and measurements of the fuel sender card; and
display the added fuel amount on a dashboard display.

14. The vehicle of claim 1, wherein the engine control module is to, responsive to the final fuel level being in the one of the zones that is not the first zone and the initial fuel level being in the first zone, calculate an amount of fuel added to the fuel tank by adding an amount of fuel injected to the engine and an amount of fuel in the one of the zones.

* * * * *